(12) United States Patent
Hui et al.

(10) Patent No.: US 8,516,459 B2
(45) Date of Patent: Aug. 20, 2013

(54) XSLT-SPECIFIC XJIT COMPILER

(75) Inventors: Chen Hui, Shanghai (CN); Dai Chunyang, Shanghai (CN); Zhang Qi, Shanghai (CN); Yun Wang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 1057 days.

(21) Appl. No.: 12/055,252

(22) Filed: Mar. 25, 2008

(65) Prior Publication Data
US 2009/0249317 A1 Oct. 1, 2009

(51) Int. Cl.
*G06F 9/44* (2006.01)
(52) U.S. Cl.
USPC .......................................... 717/148; 717/136
(58) Field of Classification Search
None
See application file for complete search history.

(56) References Cited

U.S. PATENT DOCUMENTS

| 6,081,665 | A  | * | 6/2000  | Nilsen et al. ................. 717/116 |
| 6,546,550 | B1 | * | 4/2003  | Ogata et al. .................. 717/148 |
| 2004/0010754 | A1 | * | 1/2004  | Jones ........................... 715/513 |
| 2004/0210865 | A1 | * | 10/2004 | Shimura ....................... 717/100 |
| 2006/0265689 | A1 | * | 11/2006 | Kuznetsov et al. ........... 717/117 |

* cited by examiner

*Primary Examiner* — Li B Zhen
*Assistant Examiner* — Lenin Paulino
(74) *Attorney, Agent, or Firm* — Blakely, Sokoloff, Taylor & Zafman LLP

(57) ABSTRACT

An Extensible Stylesheet Language Transformation (XSLT) processing environment receives an XSLT style sheet and an Extensible Markup Language (XML) input document. The XSLT style sheet is compiled into XSL byte code fragments. A just-in-time (JIT) compiler in the XSLT processing environment compiles the XSL byte code fragments into native code. The native code is executed to transform the XML input document into one or more XML output documents.

14 Claims, 5 Drawing Sheets

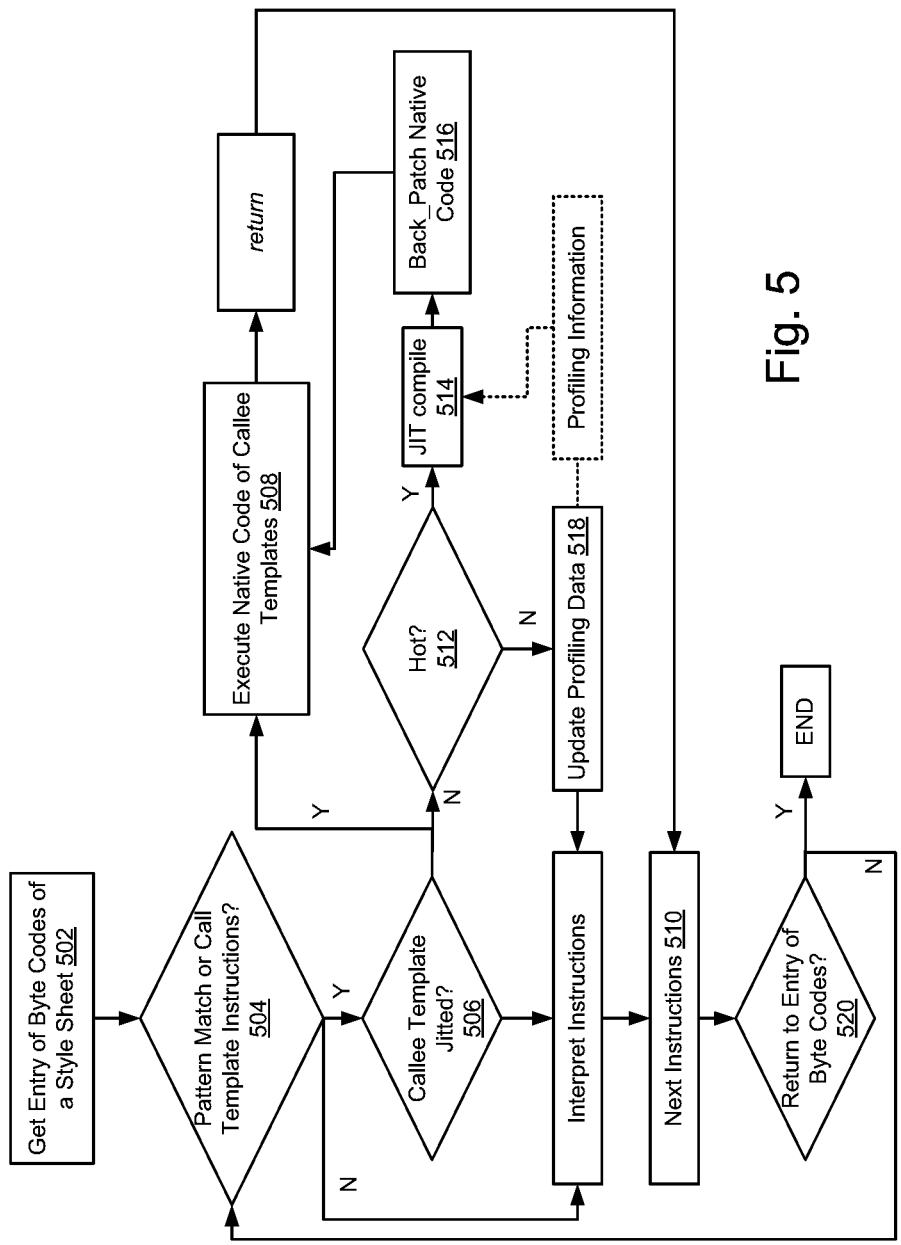

XSLT-SPECIFIC XJIT COMPILER

FIELD

Embodiments of the invention relate to Extensible Stylesheet Language (XSL) transformations, and more particularly to compilation techniques to accelerate XSL transformations.

BACKGROUND

Extensible Stylesheet Language (XSL) transformation is an important application of Extensible Markup Language (XML). XSLT (Extensible Stylesheet Language Transformation) is a language for this kind of transformation. An XSL style sheet in XSLT describes how an XML document is transformed into another XML document. Existing XSLT processors use either an interpreter or traditional compiler model to perform XSL transformation. Previous attempts to improve the efficiency of XML transformation include the use of an abstract machine, or abstract stack machine (ASM). An ASM uses ASM byte codes and an evaluator to implement the semantic representation of these byte codes.

FIG. 1 shows a framework of a processing environment implementing an abstract stack machine, such as the one discussed above. An XSLT style sheet 102 is compiled into ASM codes 114 by ASM compiler 112. ASM codes 114 are sent as input to the abstract stack machine, ASM 120. XML input document 104 (i.e., the document to be transformed) is also input to ASM 120. ASM codes 114 provide the instructions to traverse XML input document 104, select item sets from the XML document tree (created by XML tree navigator 116) and perform XSL instructions on the selected item sets. ASM 120 has its own specialized registers group 122 to record transformation context along with a memory manager 124 to hold temporary computation results.

ASM 120 interacts with various modules (e.g., output builder 130, XML tree navigator 116, pattern matcher 118, etc) to finish the transformation. These modules are loosely coupled with ASM 120. The modules can be replaced by other implementations that are consistent with the interface of ASM 120. For example, a more compact binary XML data format can be used to support large files. In such an example, encoding and implementation are encapsulated into XML tree navigator 116 and only need to provide traversal methods to ASM 120. ASM codes 114 are executed in an interpreting mode. In other words, ASM 120 interprets each ASM code one by one at runtime.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

FIG. 5 is a flow diagram illustrating XJIT compilation in an XSLT processing environment.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

As provided herein, systems, methods, and apparatuses enable a just-in-time (JIT) compilation technique to accelerate the execution of XSLT-specific virtual machine codes in an XSLT processing environment while maintaining flexibility of the entire framework. The XSLT JIT compilation technique is referred to herein as XJIT compilation, or simply XJIT. Most existing XSLT processing implementations adopt purely interpretive mode of functionality.

Embodiments described herein gain performance advantage over existing Extensible Stylesheet Language Transformtion (XSLT) processing implementations by translating XSLT specialized byte codes into native codes. Rather than compile an XSLT style sheet into a general purpose intermediate language, the source language provided as input to the XJIT compiler comprises specialized byte codes for XSLT; the XSLT semantic representation is preserved to jitting time to facilitate various optimizations.

Moreover, compared with implementations that translate XSLT style sheets into Java™ byte codes, embodiments described herein provide a demand-driven solution. For example, frequently used code fragments, or hot blocks, may be analyzed in greater depth to generate native codes for these hot blocks. The response time of regular (e.g., non-hot) code blocks may be enhanced in some embodiments by interpreting these code blocks instead of generating native code.

Figure 1:
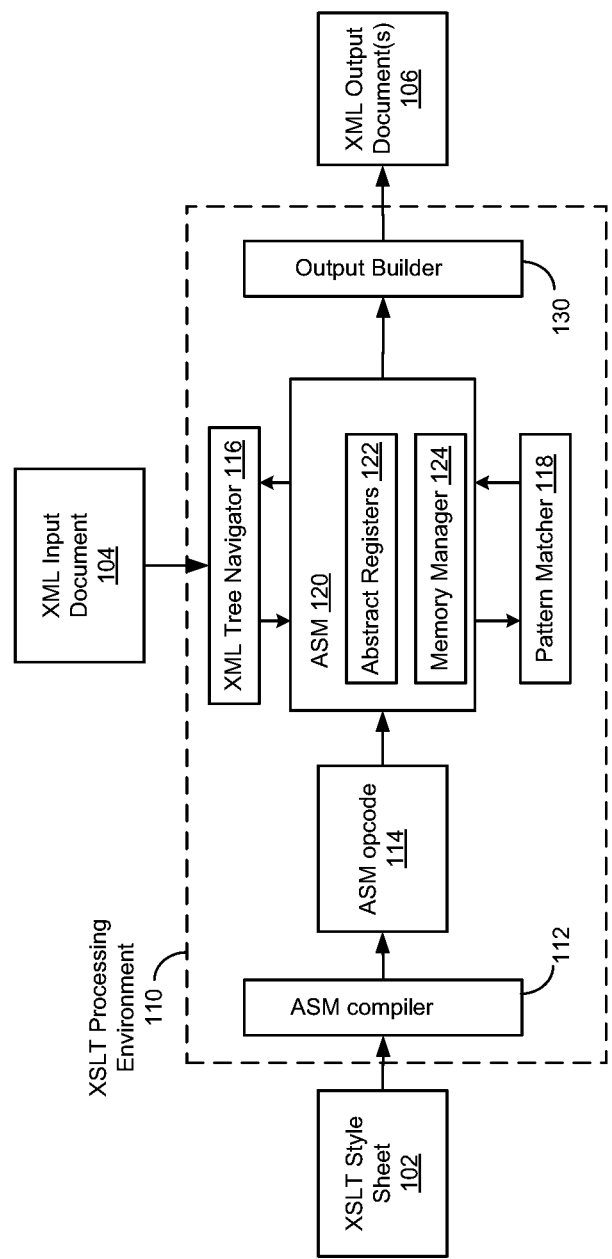
FIG. 1 is a block diagram of a prior art processing environment having an abstract stack machine.
Figure 2:
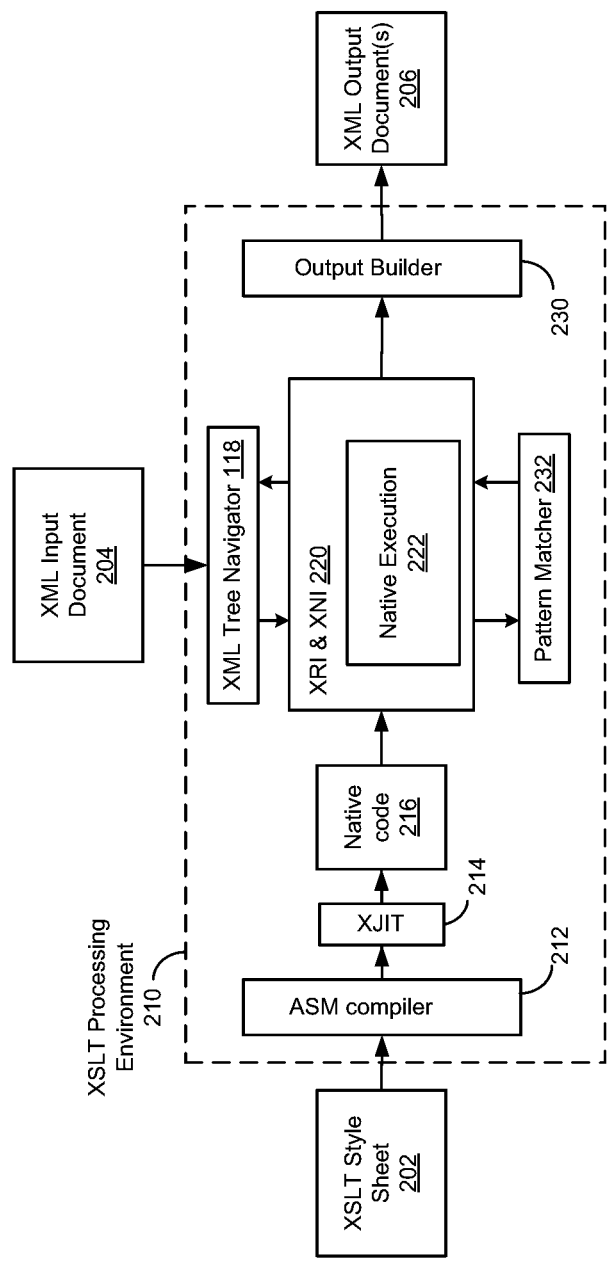
FIG. 2 is a block diagram illustrating various embodiments of an XSLT processing environment that includes an XJIT compiler.

FIG. 2 illustrates an XSLT processing environment according to various embodiments. An XSLT style sheet 202 is received by XSLT processing environment 210. XSLT style sheet 202 is compiled into a copy of specialized byte codes by an abstract stack machine (ASM) compiler 212. ASM compiler 212 can be like the prior art ASM described above. The specialized byte codes are composed of fragments for processing an XSL template or calculating a value of global variable. These code fragments may also be referred to herein as "blocks." Frequently invoked blocks are referred to herein as hot blocks. For example, a hot block might be one whose invocation frequency exceeds a threshold.

Hot blocks are compiled into native codes by XJIT 214, which is a JIT-based compiler specialized for use in XSLT processing environment 210. The resulting native (or jitted) code 216 runs faster than interpreted code for several reasons:
1. No CPU cycles are spent on the interpreter itself;
2. Optimization is based, at least in part, on global byte code analysis. For example, interpreters typically interpret each byte code separately. Some optimized interpreters improve execution efficiency by fusing several byte codes together and then reducing redundant operations resulting from the fusion(s);

3. Unlike an interpreter, a JIT-based compiler uses dynamic profiling information to guide optimization.

Additionally, unlike a JIT compiler used in a Java™ virtual machine, the source code of XJIT 214 is byte code specialized for XSLT processing. The XJIT source code may contain instructions including XML Path Language (XPath) instructions, variable definition instructions, control flow instructions, and other high-level XSLT pattern matching instructions, functions and output instructions.

In various embodiments, combinations of XPath instructions, variable definition instructions and control flow instructions are variable for a given XSLT style sheet (e.g., XSLT style sheet 202). The other high-level XSLT instructions and functions involve fixed operations for an XSLT style sheet (e.g., XSLT style sheet 202) and can be implemented as built-in functionality modules. In embodiments, XJIT 214 targets the variable instructions and generates native code that can invoke built-in functions via the XJIT native interface (XNI) 220, described in more detail below.

Figure 3:
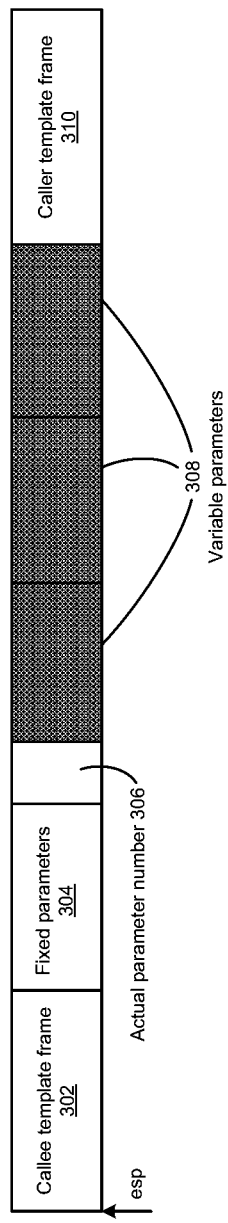
FIG. 3 illustrates a stack layout of an XSLT template invocation according to various embodiments.

FIG. 3 illustrates a stack layout 300 of an XSLT template invocation according to various embodiments. XSLT templates act like subroutines or functions as used in other languages. Following template rules, an applicable template is found and is instantiated to form part of a result tree. Instinctively, a block is the basic unit of JIT compilation. Thus, the block to compute global variables in an XSLT template has parameters. An XSLT template (e.g., callee template 302) is compiled into one or more native functions which have fixed parameters 304 (to pass computation context) and variable parameters 308 specified by the template. According to the XSLT specification (XSL Transformations (XSLT) Version 2.0, W3C Recommendation, 23 Jan. 2007), actual parameters passed into template 302 can be out of order and precise matching is not required. The XSLT specification also notes that a variable parameter passing style can be used to implement templates.

The actual parameter number 306 is passed into callee template 302, which is followed by actual parameters (i.e., variable parameters 308). Each of the parameters 308 has matching information (parameter name, uniform resource identifier (URI), etc.) and an actual value.

Referring back to FIG. 2, native execution module 222 adopts a set of special backtracking instructions in various embodiments. Backtracking instructions are used as a control flow mechanism, performing a depth-first recursive search. Native execution module 222 employs backtracking instructions to implement both tree searching and template/block invocation strategies. Backtracking instructions have a non-deterministic semantic representation: either they pass with the instruction pointer, moving to the next instruction or they fail with the instruction pointer, moving backwards to the last backtracking instruction. The successor of an instruction is determined in runtime. For example, when execution module 222 encounters the backtracking instruction:

OP_MATCH_CHILD 'a', it will find the first child node of the current node that is called 'a', then continue to execute the next instruction. Execution backtracks from successive instructions to the OP_MATCH_CHILD 'a' instruction. Upon backtracking, the next child node named "a" will be found, followed by execution the successive instructions again. This repetition continues until no "a" child node remains, at which point execution backtracks to the last instruction.

A control flow graph (CFG) is used to implement the backtracking semantic representations described above during execution. Again referring to FIG. 2, XJIT 214 transforms the compiled XSL byte codes into a CFG before generating native codes 216. This control flow graph facilitates data analysis and control flow analysis for compilation by XJIT 214.

Figure 4:
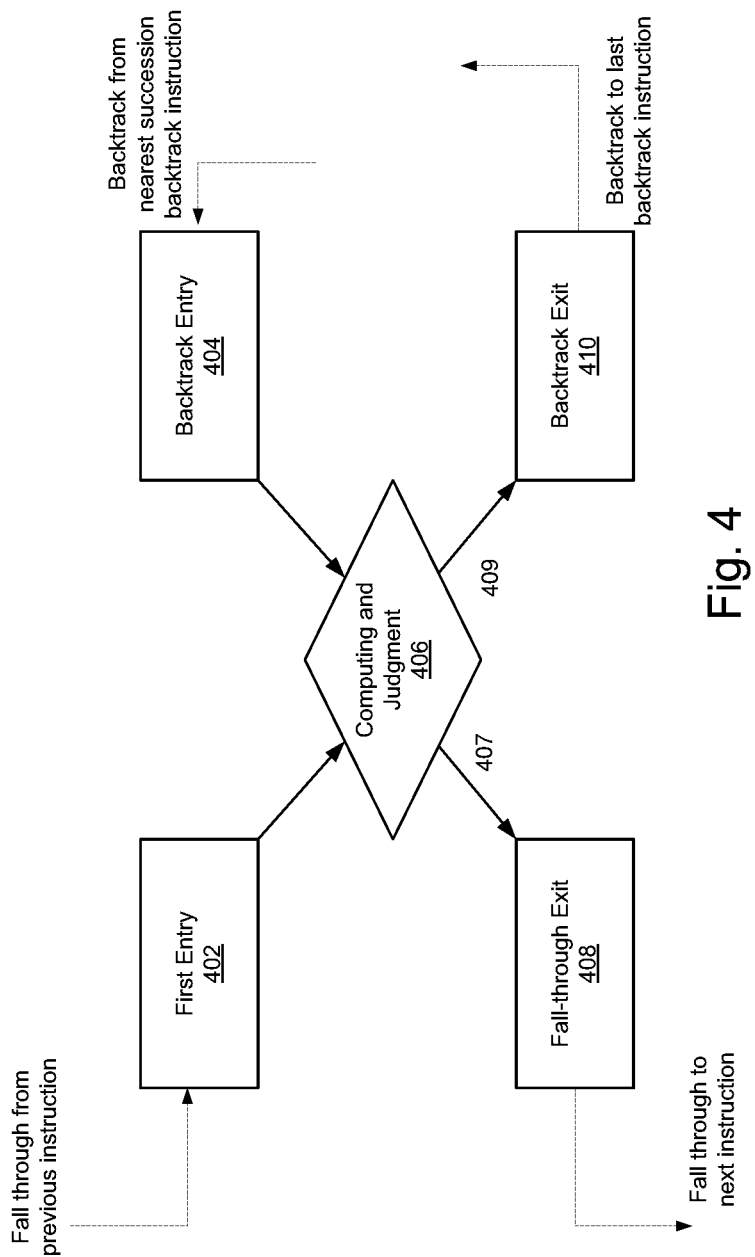
FIG. 4 illustrates a control flow graph (CFG) according to various embodiments.

FIG. 4 illustrates an efficient algorithm for constructing a control flow graph (CFG) for backtracking instructions according to various embodiments. A CFG is created for each backtracking instruction used during execution. In various embodiments, the semantic representation of a backtracking instruction is broken into five basic blocks as shown in FIG. 4.

In FIG. 4, edges are added among instructions by traversing byte codes following a backtracking trace only once. The entry block, or first entry, 402 receives the fall through from a previous instruction. The fall through instruction goes through computing and judgment block 406, which determines whether the control flow will fall through to the next instruction or backtrack to the last backtrack instruction. If a fall through determination is made, edge 407 takes the control flow to fall-through exit 408. If a backtrack determination is made, edge 409 takes the control flow to backtrack exit 410. From backtrack exit 410, the nearest backtrack instruction enters the control flow graph at backtrack entry 404.

One algorithm for creating a CFG according to various embodiments is described below.

1. The algorithm begins by designating the entry of the abstract stack machine (ASM) byte code as the current ASM instruction (cur_asm). (The entry instruction is always a backtracking instruction, any path in this template block must end with it.) A new CFG node is created, which is designated as the current CFG node (cur node). Prolog intermediate representation (IR) code (the preparation code for a template computation) is inserted into cur_node.
2. The next abstract stack machine (ASM) instruction is retrieved and designated as cur_asm.
3. If cur_asm is a joint point, a new CFG node is created and an edge is added from cur_node to the new node; The new CFG node is assigned as cur_node;
4. IR code for cur_asm is generated:
    4.1 If cur_asm is a common instruction, IR instructions are generated, implementing the semantic representation of cur_asm, and inserted into cur_node; the next instruction is assigned as cur_asm;
    4.2 If cur_asm is a backtracking instruction encounted for the first time, five new nodes (as shown in FIG. 4) are created for the instruction. The first entry (e.g., first entry 402) is assigned as cur_node. The fall-through exit node (e.g., fall-through exit 408) is designated as cur_node, while the next instruction is designated as cur_asm;
    4.3 If cur_asm is a backtracking instruction and it is not the first time it has been encountered (i.e., it is backtrack from other instructions), an edge is added from cur_node to the backtrack entry node (e.g., backtrack entry 404) of cur_asm. The backtrack exit (e.g., backtrack exit 410) of cur_asm is designated and the last backtrack instruction is assigned as cur_asm;
    4.4 If cur_asm is an unconditional jump instruction, its jump target is designated as cur_asm;
    4.5 If cur_asm is a conditional jump instruction, then
        4.5.1 a CFG fragment is constructed based on the fall-through path of the conditional jump. The CFG fragment is started by using the next instruction of cur_asm followed by repeating step 4 above until backtracking to the last backtrack instruction of cur_asm, which is a joint of two successive paths of cur_asm;

4.5.2 The jump target instruction of the conditional jump instruction is assigned as cur_asm. Step 4 above is then repeated;

4.6 If cur_asm is the entry instruction, the control flow moves to step 5 below;

4.7 If cur_asm has been translated, its last backtrack instruction is assigned as cur_asm and its backtrack entry node is designated as cur_node; Step 4 above in then repeated.

5. The epilog IR codes are inserted into cur_node, completing the creation of the CFG.

In order to maintain framework flexibility, an XJIT compiler needs to be capable of interacting with an "unmanaged" environment; for example, the object layout that the XJIT compiler manipulates is opaque, and implementation of built-in functions is invisible to the XJIT compiler. Thus, two kinds of XJIT interfaces are exposed:

1. XRI: XJIT Raw Interface

Small functions (e.g., an XPath stepping function that moves to the next sibling of a current node and retrieves the first attribute of the current node) have a simple semantic representation, and can be implemented differently based on the XML data representation. These functions need to provide intermediate representation (IR) generating functions to the XJIT compiler. In general, XRI (e.g., XRI of FIG. 2) is used to seamlessly connect XJIT generated codes with functionality modules.

2. XNI: XJIT Native Interface

For those modules having a complicated semantic representation, XRI is not suitable, in part, because it is difficult to implement complicated functionality with low-level intermediate representations. Moreover, built-in functions in various embodiments are compiled statically, which reduces the compilation time in runtime. Thus, in various embodiments, more complicate functions may be implemented using an XJIT native interface, or XNI (e.g., XNI 220 of FIG. 2).

To implement an XJIT native interface, the functionality module employs a group of runtime helper functions as wrappers. These runtime helper functions may be implemented in a programming language that is closed to native language (e.g., C programming language, etc.). Closed programming languages, such as C, allow for convenient interaction with other languages. Native code (e.g., native code 216 of FIG. 2) calls a runtime helper function to invoke functionality modules. This indirect invocation facilitates functionality implementation.

Various components described herein may be a means for performing the functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Software content (e.g., data, instructions, configuration) may be provided via an article of manufacture including a machine readable medium, which provides content that represents instructions that can be executed. The content may result in a machine performing various functions/operations described herein. A machine readable medium includes any mechanism that provides (i.e., stores and/or transmits) information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A machine readable medium may also include a storage or database from which content can be downloaded. A machine readable medium may also include a device or product having content stored thereon at a time of sale or delivery. Thus, delivering a device with stored content, or offering content for download over a communication medium may be understood as providing an article of manufacture with such content described herein.

FIG. 5 is a flow diagram illustrating XJIT compilation in an XSLT processing environment. An XSLT processor retrieves an entry of byte code for an XSLT style sheet 502. The XSLT processor determines whether a pattern match exists or whether the retrieved byte code includes one or more call template instructions 504. If there are no template instructions or pattern matches, the retrieved byte code is interpreted 520 by an interpreter. If call template instructions are included or there is a pattern match, the XSLT processor determines whether the corresponding callee template is jitted 506. If the callee template is jitted, then the native code is executed 508 and the next instructions are subsequently retrieved 510.

If the callee template is not jitted and the associated code blocks are hot (e.g., invoked frequently), then these hot blocks are compiled 514 by the XJIT compiler and the resulting native code is back-patched 516 for execution by the XLST processor. In some embodiments, code blocks that are not hot are interpreted 520 after corresponding profile data is updated 518. However, in other embodiments, all code blocks may be compiled by the XJIT compiler regardless of whether the code blocks are hot or not.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:
1. A method comprising:
receiving an Extensible Stylesheet Language Transformation (XSLT) style sheet into an XSLT processing environment;
receiving an Extensible Markup Language (XML) input document into the XSLT processing environment;
compiling the received XSLT style sheet into Extensible Stylesheet Language (XSL) byte code fragments;
compiling the XSL byte code fragments into native code when demand for the XSL byte code fragments exceeds a usage threshold, wherein compiling the XSL byte code fragments into native code comprises:
statically compiling the XSL byte code fragments into built-in function modules; and
compiling the built-in function modules into native code at runtime;
interpreting XSL byte codes fragments when demand is below the usage threshold instead of generating native code,
wherein the compiling is performed by an XSLT just-in-time (XJIT) compiler in the XSLT processing environment,
wherein the native code invokes the built-in function modules via an XJIT native interface (XNI),
wherein the XJIT compiler generates the native code from variable instructions associated with the XSLT style sheet, the generated native code having the ability to invoke the built-in functions via an XJIT native interface, and wherein source code of the XJIT compiler includes XML Path Language instructions; and executing the native code to transform the XML input document into one or more XML output documents.

2. The method of claim 1, wherein the XSLT processing environment is part of a web service system.

3. The method of claim 1, wherein the XJIT compiler is byte code specialized for XLST processing.

4. The method of claim 1, further comprising transforming the XSL byte code fragments into a control flow graph (CFG) before compiling the XSL byte code fragments into native code.

5. An article of manufacture comprising a non-transitory computer-readable storage medium having content stored thereon to provide instructions to result in an electronic device performing operations including:

receiving an Extensible Stylesheet Language Transformation (XSLT) style sheet into an XSLT processing environment;

receiving an Extensible Markup Language (XML) input document into the XSLT processing environment;

compiling the received XSLT style sheet into Extensible Stylesheet Language (XSL) byte code fragments;

compiling the XSL byte code fragments into native code when demand for the XSL byte code fragments exceeds a usage threshold, wherein compiling the XSL byte code fragments into native code comprises:

statically compiling the XSL byte code fragments into built-in function modules; and compiling the built-in function modules into native code at runtime;

interpreting XSL byte codes fragments when demand is below the usage threshold instead of generating native code, wherein the compiling is performed by an XSLT just-in-time (XJIT) compiler in the XSLT processing environment, wherein the native code invokes the built-in function modules via an XJIT native interface (XNI), wherein the XJIT compiler generates the native code from variable instructions associated with the XSLT style sheet, the generated native code having the ability to invoke the built-in functions via an XJIT native interface, and wherein source code of the XJIT compiler includes XML Path Language instructions; and executing the native code to transform the XML input document into one or more XML output documents.

6. The article of manufacture of claim 5, wherein the XSLT processing environment is part of a web service system.

7. The article of manufacture of claim 5, wherein the XJIT compiler is byte code specialized for XLST processing.

8. The article of manufacture of claim 5, comprising instructions that result in the electronic device performing further operations including transforming the XSL byte code fragments into a control flow graph (CFG) before compiling the XSL byte code fragments into native code.

9. A non-transitory computer-readable storage medium having computer executable instructions that, when executed, cause a machine to perform a method, the method comprising:

accessing a communication interface; and providing a data signal on the communication interface having data describing:

an XSLT processing module to receive an Extensible Stylesheet Language Transformation (XSLT) style sheet and an Extensible Markup Language (XML) input document;

a compiler to compile the received XSLT style sheet into Extensible Stylesheet Language (XSL) byte code fragments;

an XSLT just-in-time (XJIT) compiler to compile the XSL byte code fragments into native code when demand for the XSL byte code fragments exceeds a usage threshold, wherein compiling the XSL byte code fragments into native code comprises:

statically compiling the XSL byte code fragments into built-in function modules; and compiling the built-in function modules into native code at runtime:

an interpreter for interpreting XSL byte codes fragments when demand is below the usage threshold instead of generating native code, wherein the XJIT compiler generates the native code from variable instructions associated with the XSLT style sheet, the generated native code having the ability to invoke the built-in functions via an XJIT native interface, and wherein source code of the XJIT compiler includes XML Path Language instructions, and wherein the native code invokes the built-in function modules via an XJIT native interface (XNI); and an execution module to execute the native code to transform the XML input document into one or more XML output documents.

10. The non-transitory computer-readable storage medium of claim 9, wherein the XSLT processing environment is part of a web service system.

11. The non-transitory computer-readable storage medium of claim 9, wherein the XJIT compiler is byte code specialized for XLST processing.

12. The non-transitory computer-readable storage medium of claim 9, wherein the method further providing on the communication interface a data signal having data describing:

a transformation module to transform the XSL byte code fragments into a control flow graph (CFG) before compiling the XSL byte code fragments into native code.

13. The article of manufacture of claim 5, wherein the XJIT complier is operable to receive source code having instructions including at least one of:

variable definition instructions, control flow instructions, or high-level XSLT pattern matching instructions, functions and output instructions.

14. The article of manufacture of claim 5 having content stored thereon to provide further instructions to result in the electronic device performing further operations including:

applying, in response to compiling the received XSLT style sheet into the XSL byte code fragments, a depth-first recursive search algorithm to adopt a set of back tracking instructions for control flow, wherein the back tracking instructions can either pass with an instruction pointer to move to a next instruction, or fail with the instruction pointer and move backwards to a previous back tracking instruction.

* * * * *